US007882148B2

(12) United States Patent
Werner et al.

(10) Patent No.: US 7,882,148 B2
(45) Date of Patent: Feb. 1, 2011

(54) CONTEXT MODELER AND METHOD FOR MODELING A CONTEXT REPRESENTATION

(75) Inventors: Horst Werner, Rettigheim (DE); Joerg Beringer, Frankfurt (DE)

(73) Assignee: SAP AG, Walldorf (DE)

( * ) Notice: Subject to any disclaimer, the term of this patent is extended or adjusted under 35 U.S.C. 154(b) by 1219 days.

(21) Appl. No.: 11/048,703

(22) Filed: Feb. 3, 2005

(65) Prior Publication Data
US 2005/0197823 A1    Sep. 8, 2005

(30) Foreign Application Priority Data
Feb. 3, 2004     (EP)    ................... 04075325

(51) Int. Cl.
*G06F 17/20*    (2006.01)
*G06F 15/16*    (2006.01)
(52) U.S. Cl. .................. 707/803; 705/348; 717/104
(58) Field of Classification Search ................. 707/803; 705/348; 717/104
See application file for complete search history.

(56) References Cited
U.S. PATENT DOCUMENTS
6,389,587 B1 *   5/2002   Lewis ........................ 717/151

2004/0044962 A1 *   3/2004   Green et al. .................. 715/513
2004/0068697 A1 *   4/2004   Harik et al. .................. 715/513

OTHER PUBLICATIONS

Gross et al; Context Modelling for Information Retrieval—Requirements and Approaches; Published 2002; pp. 1-10.*

* cited by examiner

*Primary Examiner*—John E Breene
*Assistant Examiner*—Alex Gofman
(74) *Attorney, Agent, or Firm*—Finnegan, Henderson, Farabow, Garrett, and Dunner, LLP

(57) ABSTRACT

A context modeler models a context representation and a method models a context representation. The context modeler models a context representation in an application. The context is represented in a current situation by at least one context entity that is included in at least one collection of references to a plurality of entities in a database in accordance with the situation. The context modeler includes an activation model for assigning an activation attribute to the at least one context entity indicating the importance of the at least one context entity in the current situation. The context modeler takes into account the activation attribute in modeling the context representation.

33 Claims, 4 Drawing Sheets

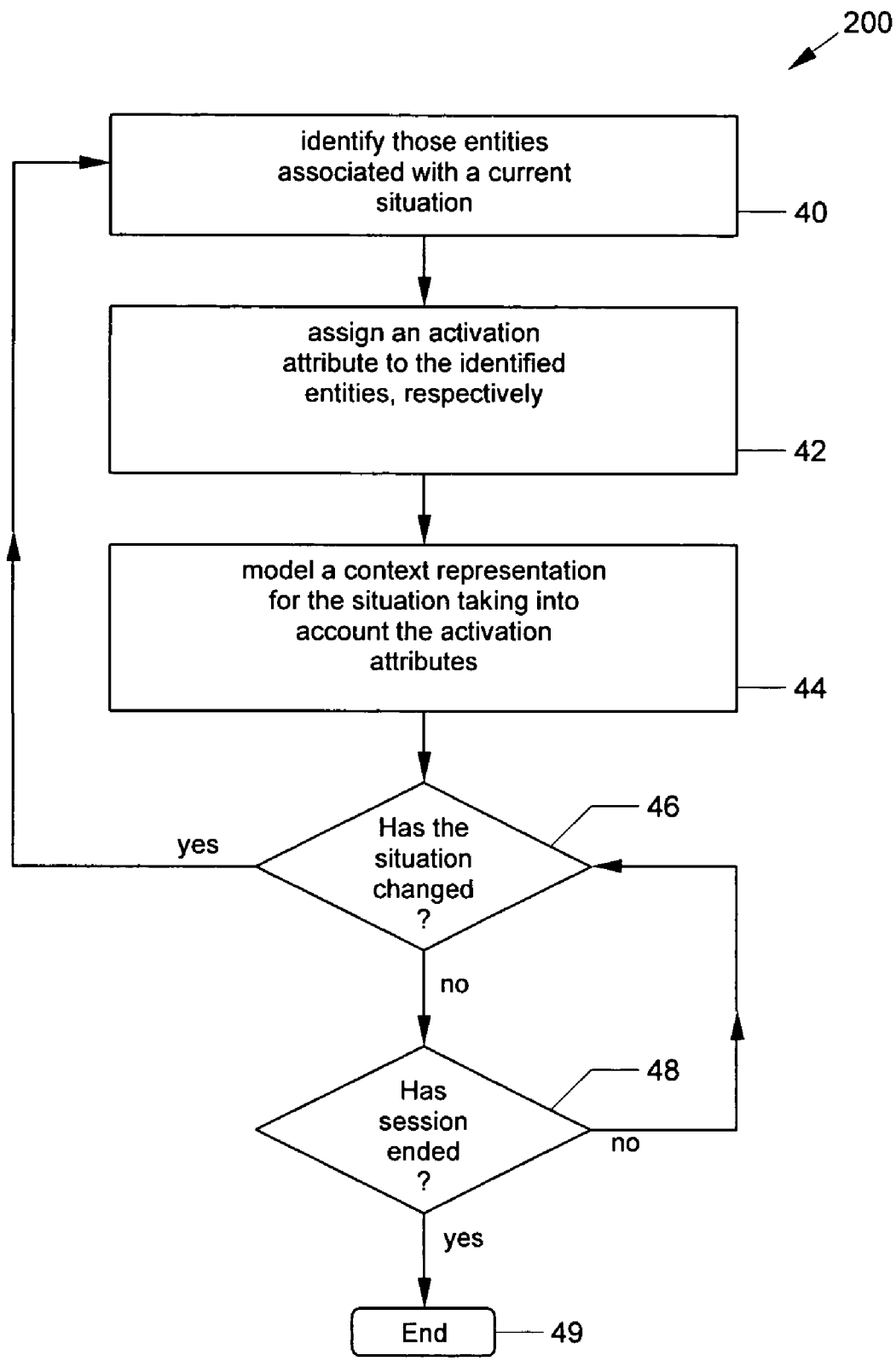

CONTEXT MODELER AND METHOD FOR MODELING A CONTEXT REPRESENTATION

This application is based upon and claims the benefit of priority from prior patent application EP 04075325.3, filed Feb. 3, 2004, the entire contents of which are expressly incorporated herein by reference.

BACKGROUND

I. Technical Field

The present invention relates to a context modeler for modeling a context representation and a method of modeling a context representation.

II. Background Information

Applications such as business applications frequently allow the user to work in different contexts. These applications adapt information that is displayed and the actions or objects that the user may select according to a respective context. However, contexts are not explicitly modeled, and are instead implicitly given by the various screens of an application's user interface. Limited context information is kept when the user switches to another screen. While some applications use lists of recently or frequently used objects, the relationship of these objects with respect to the user's activities is unknown to the application.

Therefore, one problem with conventional applications is that the context information is poor and unavailable for generic algorithms. Instead, the context sensitivity has to be hard coded for each screen. The present invention addresses these problems encountered with conventional applications. In particular, embodiments consistent with the present invention improve the context representation in the application and improve the relevance of data displayed to a user in a situation.

SUMMARY

Consistent with the present invention, a context modeler is provided for modeling a context representation in an application. The context modeler comprises a database storing at least one collection of references to a plurality of entities; and an activation model for assigning an activation attribute to at least one context entity indicating the importance of the at least one context entity in a current situation, wherein the context modeler takes into account an activation attribute in modeling the context representation.

Also consistent with the present invention, a method is provided of modeling a context representation in an application. The method comprises representing a current situation by at least one context entity which is included in at least one collection of references to a plurality of entities in a database; and modeling a context representation in accordance with an activation model by assigning an activation attribute to the at least one context entity indicating the importance of the at least one context entity in a current situation, wherein an activation attribute is taken into account.

BRIEF DESCRIPTION OF THE DRAWINGS

The accompanying drawings, which are incorporated in and constitute a part of this disclosure, illustrate various embodiments and aspects consistent with the present invention. In the drawings:

FIG. 4 shows a flow diagram incorporating a method of managing a database in accordance with an embodiment consistent with the present invention.

DETAILED DESCRIPTION

Figure 1:
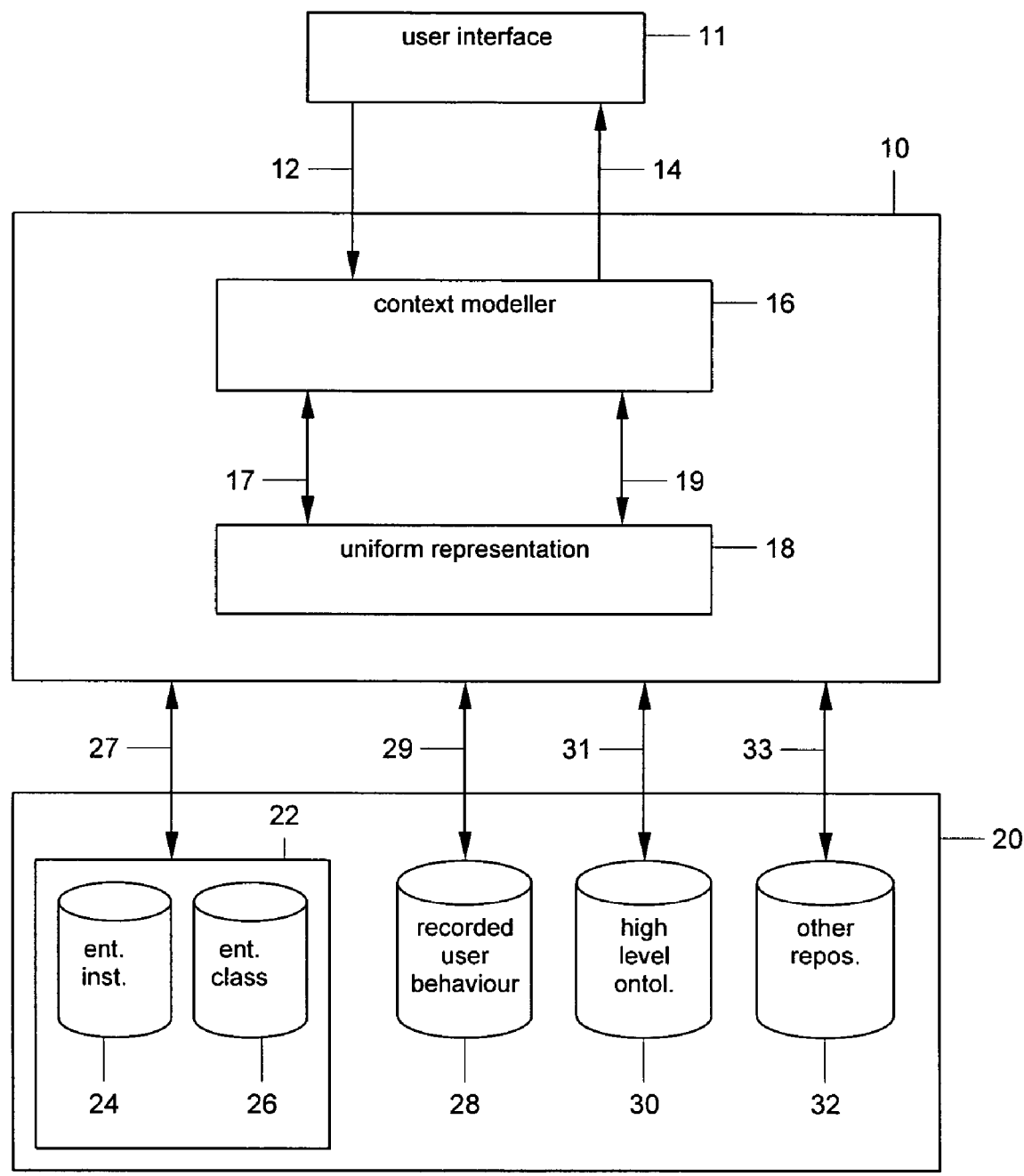
FIG. 1 shows an architecture incorporating an embodiment consistent with the present invention.

The following detailed description refers to the accompanying drawings. Wherever possible, the same reference numbers are used in the drawings and the following description to refer to the same or similar parts. While several exemplary embodiments and features consistent with the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

FIG. 1 shows an architecture incorporating an embodiment consistent with the present invention. A system 10 is shown on which the process described hereinafter may be implemented. In particular, the data flow and data processing steps initiated by the context modeler of an embodiment of the present invention are shown. The context modeler is shown for modeling a context representation in a business application 20 where the context is represented by one or more collections of references to entities 61 in a database 22. The context modeler is associated with a uniform representation server 18. Context modeler 16 may typically be associated with a user interface 11 that is a graphic user interface (GUI), with which a user interacts. Typically, at any one time the user is involved in a procedure that may include an action, or a process 12, or both an action and a process. Context modeler 16 is also typically associated with a database 22 that may form part of a business application 20. Context modeler 16 models a context representation on the basis of entities stored in the database 22.

The action or process 12 is input to context modeler 16. Data may be exchanged 12, 14 between the user interface 11 and context modeler 16. Similarly, data may be exchanged 17, 19 between context modeler 16 and the uniform representation server 18.

Context modeler 16 determines which entities 61* are to form context representation 60. Context representation 60 typically includes at least one entity 61*. Context modeler 16 in association with the uniform representation server 18 further stores these entities 61, which may be recently used entities 61 and/or entities 61 related to these, by means of a semantic net representation. The context of an entity or a situation as defined by the process or action is a collection of facts and entities 61 that are of special importance for that entity or situation and which usually have a direct or indirect relationship to the entity or situation. Within a business application, such as a business application in which a database is provided, a context may be defined for a variety of entities 61 or a situation including, but not limited to, a user, a session or a business entity. For a user the context may include entities 61 including his role, projects, or personal preferences. For a session the context may include entities 61 including a user, last actions, or manipulated business entities 61. For a certain business object of the business application, the context may include entities 61 including past projects, or orders for a customer. A business object is typically an entity 61, 61' stored in a database. A business application 20 may typically include a database 22 in which business entities 61 are stored.

A combination of different contexts, for example, a user context and a session context, may be combined to form a current context within a session. The elements 61* ("elements" are referred to as being entities 61 belonging to a group of entities 61) of such a composed context may have different temporal validities. The temporal validity may be defined by the system 10 and/or by a user. For example, there are long-term elements such as the industry branch of the user's company, the user's role in that company, his current projects, his activities in the last few days. Similarly, there are short term elements such as, but not limited to the current transaction, and entities 61 displayed or manipulated in the current session.

Technically, context may be represented by a number of instances of business entities 61, processes/actions, or situations. A situation may be defined by at least one or a process or action.

As mentioned above, the context modeler 16 identifies context elements or entities 61, and entities 61 related to these for the context representation 60. In a typical relational database 22, a plurality of entities are stored in a plurality of tables in accordance with their entity type. For entities from different tables to be included in the context representation modeled by the context modeler 16, a uniform representation server 18 is provided to store in a uniform representation the entities from different tables. In one embodiment, the uniform representation server 18 includes a semantic net representation which, in addition to providing a uniform representation, stores the relations between the different entity types. In this particular embodiment, the uniform representation server 18 is a semantic net server.

Within the database 22 there are representations of business entities 61 which are related to each other. This relation can be explicitly modeled in the database. In this case it is called first level relatedness.

The relatedness can also be implicitly contained by the database if there is an intermediate business object to which two other business entities 61 are related. This would be second level relatedness. Other chains of relations between business entities 61 can be found and depending on the length of such a chain there is third level, fourth level relatedness and so on.

A problem encountered in evaluation of relatedness of second and higher levels is the huge amount of data that must be evaluated. If an average entity is (directly) related to 20 other entities 61, there are 400 entities 61 with a second level relatedness, 8,000 third-level-related entities 61 and 160,000 fourth-level-related entities 61. So if higher-level relatedness is to be displayed to the user, an intelligent selection of relevant entities 61 needs to be performed. The relevance of entities 61 is context dependent. The context modeler 16 ascertains the relevance of the entities 61 to determine the limited object set to be evaluated.

In a further embodiment consistent with the present invention, the relatedness between two entities 61 may be not at all in the database model but in the mind of the user. This kind of relatedness is included into a database, according to an embodiment of the present invention, if an appropriate mechanism is provided that works independently of the database's entity relationship model. For example, such an independent mechanism may be explicitly declared by the user or deduced from his behavior.

As mentioned, the context modeler 16 identifies the context representation from a uniform representation stored in the uniform representation server 18.

As mentioned further, the context modeler 16 may identify the context representation from a semantic net representation stored in a semantic net server. A semantic net is a data structure made up of nodes and relations between those nodes. The nodes represent terms and they are embedded in abstraction hierarchy by means of the special relation type "is a." A semantic net is the common way of representing ontologies in a computer system.

In conventional applications, semantic nets are used as an abstraction layer to search and navigate in database contents. In contrast, according to an embodiment of the present invention, context is modeled in a business application by storing context-relevant entities 61 and entities 61 related to these by means of a semantic net. Representations of processes and actions may also be integrated in this data structure as well as a general knowledge ontology.

An ontology is an explicit specification of a conceptualization. A conceptualization is an abstract, simplified view of the world it is desired to represent for some purpose. An ontology contains the vocabulary (terms or labels) and the definition of the concepts and their relationships for a given domain. An ontology is a representation that exists independent of any computer models or implementations.

The process or action 12 may include a request to have certain data represented or displayed from a database 22 which forms part of an application. The invention is not limited with respect to the type of application. For example, the application may be a business application or the like. In FIG. 1, a business application 20 is shown. The business application includes a database 22 in which business entities 61 are stored. In a first storage medium 24, entity instances are stored. In a second storage medium 26, entity classes are stored. Business application 20 further includes a recorded user behavior storage medium 28 for storing user behavior, a high level ontology storage medium 30 for storing a high level ontology, and other repositories 32 for storing other data. Database 22, recorded user behavior storage medium 28, high level ontology storage medium 39, and other repositories 32 may exchange data with the user interface 10 via communication links 27, 29, 31 and 33, respectively.

Having initiated a process or action, the user receives an output in the form of a delivery of data 14 from database 22 representing the results of the process or action. The delivery of data 14 is influenced in accordance with the context representation modeled by context modeler 16. In particular, the user's behavior is observed by the system 10, in particular in terms of the actions 66 and processes 65 being carried out, and is used by context modeler 16 to model the context representation.

In the example, only one database is shown. The invention is not limited in this respect since context modeler 16 may be arranged to model a context representation to influence the delivery of data from at least one database. For example, a plurality of databases may influenced by the context representation modeled by context modeler 16.

Figure 2:
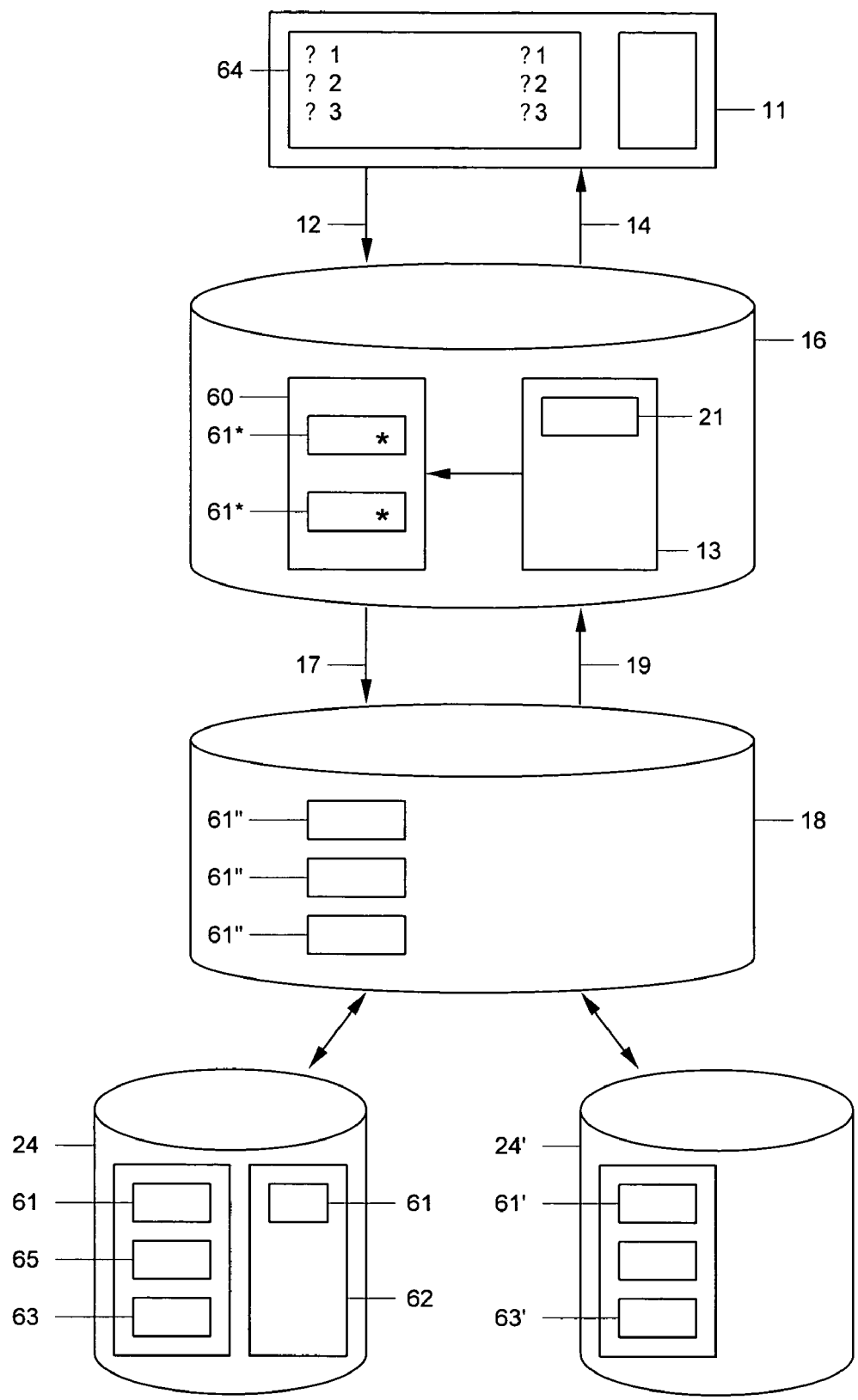
FIG. 2 shows aspects of the architecture shown in FIG. 2 in further detail.

FIG. 2 shows aspects of the architecture shown in FIG. 1 in further detail. In particular, FIG. 2 shows a plurality of entities 61 stored in a first storage medium 24 and a plurality of entities 61' stored in a second storage medium 24'. In each storage medium 24, 24', a plurality of entities 61, 61' are stored in at least one table 62, 63, 63', respectively. For the case that the entities 61 form a group, one entity within that group is referred to as an element 65. The uniform representation server 18 stores a uniform representation of the entities 61, 61'. In the embodiment, where a semantic net server is provided, the semantic net server stores a semantic net representation which includes a uniform representation of the entities and the relations between the entities 61. In one embodiment, the uniform representation server provides a uniform representation by associating an attribute A with each entity. The attribute A is a value included in the representation of an entity, and may for example, be a number or a word. In this way, it is not necessary to use different tables or structures for different entity types. Instead, it is possible to represent the different entity types in a uniform manner. In order to ascertain what type an entity is, the type attribute A is evaluated to find out for example, that a particular entity "is a person" or "is a product."

Further, with reference to FIG. 2, the user is typically involved with procedures that may include processes and/or actions shown by triangle 1, 2, 3 and circle 1, 2, and 3. The procedures give rise to a situation 64. Context modeler 16 observes the behavior of the user in terms of the procedures carried out. The context modeler models the context in response to the situation using the "uniform net" representation stored in the uniform representation server 18. Representations of the processes and actions followed are created in terms of the entities 61 involved or associated with each particular process and/or action. A uniform representation of the procedures followed is formed. If a semantic net server is used, the relations between the representations of the processes and actions are included. The context modeler 16 identifies the entity or entities 61 relevant to the particular processes and actions being followed at a particular moment in time and models a context representation to include the identified entity or entities 61. The context modeler 16 includes an actuation module 13 for assigning and evaluating an actuation value to entities 61 considered relevant to a situation 64. The context representation 60 including those entities 61* considered relevant to the situation 64 is modeled using the activation module 13, as described in further detail with reference to FIG. 3.

Figure 3:
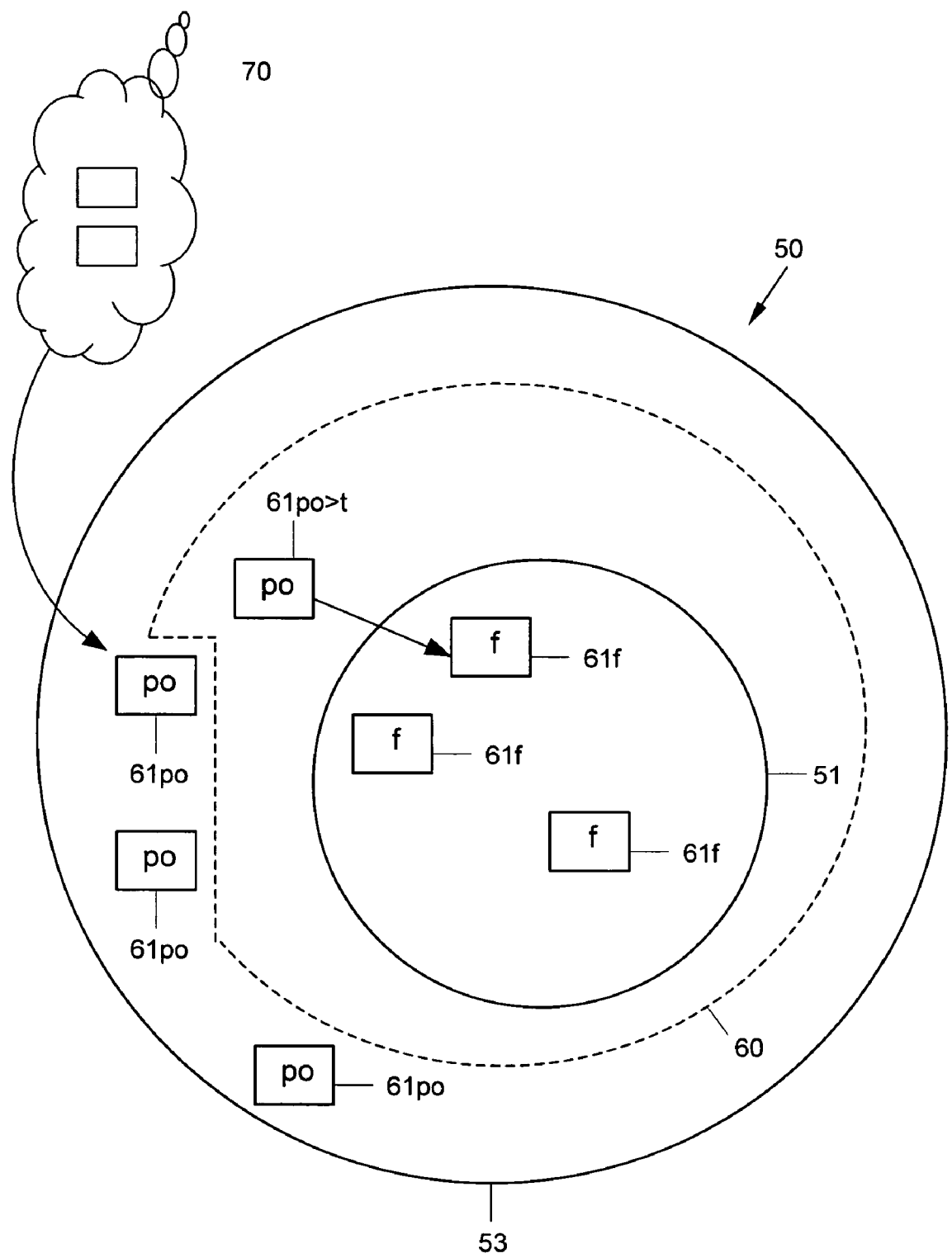
FIG. 3 shows a context representation modeled according to an embodiment consistent with the present invention.

FIG. 3 shows a context representation modeled according to an embodiment of the present invention. For any representation of context 61* as a set of currently considered entities 61—independent of whether a semantic net or another structure is chosen for the representation of this set—an importance ranking for the elements of the set is provided by the activation module 13. In this way, good context sensitivity is achieved. According to an embodiment of the present invention, each entity 61 in the context modeler 16 bears an activation attribute, which may for example, be a value, for example, a numeric value. The activation value indicates its relative importance of the entity in a particular context. The context representation includes an "active" context, which contains the focus entities, for example, the user and the business entities and actions present on the detail screen. The active context may further include related entities which have been identified as relevant for the current context. The entities in the active context have a "base activation" which is initially proportional to the number of entities in the active context related to an entity. The base activation is subject to a temporal fade curve and may also be raised when an entity is "touched," that is when the entity is used in connection with a user interaction.

The potential context is a group of entities referred to by entities in the active context. The activation of entities in the potential context is derived from the activation of the referring entities in the active context and therefore, is called the "derived activation." It may be calculated as the sum of the base activations of the referring active context entities. Further, each may be multiplied with a weight factor attached to the referring relation.

If the activation of an entity in the potential context exceeds a predetermined threshold, it is moved over to the active context. At the same time, its derived activation is replaced by a base activation, which is no longer dependent on the activations of the referring context entities. Also, its own context, for example, its related entities, is added to the potential context.

The base activation of entities in the context decreases with time according to a predefined fade curve. The form of the fade curve is variable and may depend on the maximal degree of activation that an entity has achieved. When the activation of an entity falls below a predetermined threshold the entity is removed from the context.

With reference to FIG. 3, the session context 50 is made up from circles 51, 53 in the center 51, the focus entities $61f$, which are located and which correspond to the user, and the business entities and actions which are present in the detail screen defining the situation 64. Also, the circle contains entities which are directly or indirectly related to the focus entities and have been identified to be of importance in the current context. This is referred to as the active context. The entities $61f$ in the active context have an activation attribute f, which is the highest activation value.

The second ring 53 defines the potential context and includes entities which are directly related to entities 61 in the active context, and which have not yet been identified to be of special importance in the current context. For these potential context entities $62po$, a derived activation attribute po is defined.

Each entity 61 touched by the user is automatically moved to the active context 51. Whenever an entity $61f$ is put into the active context, all entities it is related to are put into the potential context 53. The activation of entities is accumulated if they are related to more than one entity. If the activation of an entity $61po$ in the potential context exceeds a certain threshold $61po > t$, it is moved over to the active context $61f$ and its own context 70 is added to the potential context.

The activation of entities in the context may decrease with time according to a predefined fade curve. In this way a time dependent weighting to the activation is achieved. The form of the fade curve is variable and may depend on the maximal degree of activation that an entity has achieved. When the activation of an entity falls below a certain threshold the entity is removed from the context.

In an embodiment of the present invention, modeling a context occurs by storing recently used entities and entities related to these in a storage medium and by assigning an activation value to these entities, which can be used as a measurement of the importance of each entity.

In a preferred embodiment, representations of business entities, business entity classes, actions, users, and roles are stored in a storage medium together with an activation value, and are used to determine the most relevant context representation at any one moment in time. In a further embodiment, fade curves are provided to give the activation values a time dependency. In a further embodiment, entities relating to context entities are included in the context based on a predetermined activation threshold. If the activation value of an entity lies above the activation threshold, the entity is included in the context representation. If the activation value of an entity lies below the activation threshold, the entity is not included in the context representation.

A further advantage of the present invention is that the context sensitivity of application, including databases, is enhanced, and irrelevant data is hidden from the user, thus allowing him to concentrate on the data most relevant to his situation. Further additional related data and/or actions are offered to the user. Embodiments consistent with the present invention provide the further advantage of providing probable values of input fields based on the context representation.

As mentioned above, according to an embodiment of the present invention, probable values for given input fields are determined and proposed by the system 100. This is referred to as slot filling. For the purpose of slot filling, the system reduces the set of indirectly related entities 61 to those elements fitting in the given slot/input field by entity type and/or other required attributes. This is achieved by selecting from a large number of possible values only those which probably make sense in the current context. The current context as modeled by the context modeler 16 is taken into account.

The algorithm to identify relevant entities 61 in a large object set, that is an algorithm whose function is a context sensitive filter, determines the intersection between the given large object set and the set of indirectly or directly related entities 61.

In one embodiment of the present invention, there is provided a context modeler 13 for modeling a context representation 60, 61\* in an application. The context is represented in a current situation 64 by at least one context entity 61$f$ which is included in at least one collection of references to a plurality of entities 61 in a database 22 in accordance with the situation 64. The context modeler 13 includes an activation model 21 for assigning an activation attribute f, pc, po to the at least one context entity 61$f$ indicating the importance of the at least one context entity in the current situation 64, wherein the context modeler 13 takes into account the activation attribute f, po in modeling the context representation 60, 61\*. In this way, relevant entities can be identified in a given context. In a further embodiment, the activation attribute f, po has a value. In this way, the activation attribute can be manipulated. In particular, the value is numeric. In this way, the numeric value can be used in a calculator to evaluate the importance of entities.

In a further embodiment, the context modeler 13 is arranged to model the context representation 60, 61\* to include an entity related to the at least one context entity, and that the importance of the related entity is derived from the activation attribute f, po, pc of the at least one context entity referring to the related entity. In yet a further embodiment, the context modeler 13 is arranged to add an entity 61$po>t$ related to at least one context entity to the context representation if the derived importance exceeds a predetermined threshold. In this way, entities are turned into context entities.

By providing a threshold value, a wider scope of context is achieved. Similarly, the context modeler 13 may be arranged to remove the at least one context entity from the context representation if its importance falls below a predetermined threshold.

In a further embodiment, the value of the activation attribute of the at least one context entity varies in a time dependent manner. For example, the value of the activation attribute decreases over time according to a predetermined fade curve. In a further embodiment, the predetermined fade curve is arranged to vary depending on at least one of the highest activation attribute value of the at least one context entity reached and the frequency of usages of the at least one context entity. Further, the value of the activation attribute increases if the entity is used in connection with a user interaction. It is noted that time may be measured chronometrically as well as in terms of the number of user interactions. In a further embodiment, the context modeler 13 includes an attribute calculator 21 for calculating a value of the activation attribute f, po.

For the calculation of the activation of the context entities, two embodiments are described. In one embodiment, the calculator 21 calculates the attribute in a cyclic manner. In particular, the calculator 21 is arranged, in a first cycle, to assign a preset activation value to the at least one context entity and, in a second and any subsequent cycle, to recalculate the activation attribute value by taking into account the sum of the activation attribute values of the at least one other context entity related to said entity.

Furthermore, the calculator 21 may be arranged to take into account a weighting factor characteristic of the kind of relation between the at least one context entity and the related entity. Yet, further, the calculator 21 may be arranged to apply a scaling factor to the activation attribute values, so that the sum of the activation values of the context entities is substantially a constant. It has been found that such a cyclic algorithm converges after a time, that is, the activation of each entity approximates a substantially fixed value.

Alternatively, the calculator 21 may be arranged to calculate the activation attribute value of the at least one context entity on the basis of the number of entities related to the at least one context entity. Further, the calculator 21 may be arranged to calculate the activation attribute value of the at least one context entity on the basis of the kind of relationship between entities related to the at least one context entity. It has been found that this alternative embodiment provides a fast calculation because when the activation of a context entity is changed, no recalculation is necessary for the other context entities.

In yet a further embodiment, the derived importance is determined in accordance with the sum of the products of the activation attribute values of the referring at least one context entity and a weighting factor assigned to the relation type linking the at least one context entity and the referred entity. In this way, the context sensitivity is further improved.

FIG. 4 shows a flow diagram incorporating a method of modeling a context representation in accordance with an embodiment of the present invention. As can be seen, a process 200 is shown which includes the steps of: identifying those entities associated with a current situation (step 40), assigning an activation attribute to the identified entities, respectively (step 42), and modeling a context representation for the situation taking into account the activation attributes (step 44). It is subsequently ascertained whether the situation has changed (step 46). If the situation has changed, the process returns to step 40. If the situation has not changed, it is ascertained whether the session has ended, if the session has ended, the process ends (step 49). If the session has not ended, the process returns to step 46.

In a particular embodiment of the present invention, a method is provided for modeling a context representation 60, 61\* in an application, wherein the context is represented in a current situation 64 by at least one context entity which is included in at least one collection of references to a plurality of entities in a database 22 in accordance with the situation 64. The method comprises modeling a context representation 60, 61\* in accordance with an activation model 21 by assigning an activation attribute f, po to the at least one context entity indicating the importance of the at least one context entity in the current situation 64, wherein the modeling step includes the step of taking into account the activation attribute f, po.

In another embodiment, the modeling step includes the step of identifying those entities in the database associated with the current situation. In a further embodiment, the further step of assigning a value to the activation attribute f, po may be included. In particular, the step of assigning a numeric value to the activation attribute f, po.

In a further embodiment, the modeling step includes the step of considering for the context representation an entity related to the at least one context entity, and that the importance of the related entity is derived from the activation attribute of the at least one context entity referring to the related entity. The modeling step may also include the step of adding an entity related to at least one context entity $61po>t$ to the context representation 60, 61* if the derived importance exceeds a predetermined threshold. Similarly, the modeling step may include the step of removing the at least one context entity from the context representation 60, 61* if its importance falls below a predetermined threshold.

In a further embodiment, the modeling step includes the step of varying in a time dependent manner the value of the activation attribute of the at least one context entity. In particular, the varying step includes the step of decreasing over time the value of the activation attribute according to a predetermined fade curve. Further, the decreasing step may include the step of determining the predetermined fade curve depending on at least one of the highest activation attribute value of the at least one context entity reached and the frequency of usages of the at least one context entity. Further, the varying step includes the step of increasing the value of the activation attribute f, po if the entity is used in connection with a user interaction.

In yet a further embodiment, the modeling step includes the step of calculating a value of the activation attribute f, po. In particular, the calculating step calculates the attribute in a cyclic manner. The calculating step may includes the steps of, in a first cycle, assigning a preset activation attribute value to the at least one context entity and, in a second and any subsequent cycle, recalculating the activation attribute value by taking into account the sum of the activation attribute values of an entity related to the at least one context entity. Further, the calculating step includes the step of taking into account a weighting factor characteristic of the kind of relation between the at least one context entity and the related entity. Further, the calculating step includes the step of applying a scaling factor to the activation attribute values, so that the sum of the activation values of the context entities is substantially a constant. Yet further, the calculating step includes the step of calculating the activation attribute value of the at least one context entity on the basis of the number of entities related to the at least one context entity.

In an alternative embodiment, the calculating step includes the step of calculating the activation attribute value of the at least one context entity on the basis of the kind of relationship between entities related to the at least one context entity.

In yet a further embodiment, the derived importance is determined in accordance with the sum of the products of the activation attribute values of the referring at least one context entity and a weighting factor assigned to the relation type linking the at least one context entity and the referred entity.

Embodiments consistent with the present invention have application to a user terminal comprising means operable to perform any of the methods described. Embodiments also have application to a program storage device readable by a processing apparatus, said device embodying a program of instructions executable by the processor to perform the steps of any one of the methods described.

The invention as described can be implemented in digital electronic circuitry, or in computer hardware, firmware, software, or in combination thereof. An apparatus according to the present invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device.

Each computer program can be implemented in a high-level procedural or object-oriented programming language, or in assembly or machine language if desired; and in any case, the language can be a compiled or interpreted language. Suitable processors include, by way of example, both general and special purpose microprocessors. Typically, a processor will receive instructions and data from a read-only memory and/or a random access memory. Typically, a computer will include one or more mass storage devices for storing data files. Such devices include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EEPROM, and flash memory devices; magnetic disks such as internal hard disks and removable disks; magneto-optical disks; and CD-ROM disks. Any of the foregoing can be supplemented by, or incorporated in ASICs (application specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

While certain features and embodiments of the invention have been described, other embodiments of the invention will be apparent to those skilled in the art from consideration of the specification and practice of the embodiments of the invention disclosed herein. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer system for modeling a context representation in a business application, comprising:
    a database storing at least one collection of references to a plurality of entities; and
    a processor executing instructions to:
    determine a subset of the plurality of entities that are relevant to a current context, the current context comprising a combination of at least a user context and a session context, the user context comprising at least one of a role, project, or personal preference, and the session context comprising at least one of a last action or a manipulated business entity,
    assign an activation attribute to at least one context entity included in the determined subset, the at least one context entity having a temporal validity, and the activation attribute indicating an importance level of the at least one context entity in the current context, and model the context representation using the activation attribute assigned to the at least one context entity, wherein the modeling comprises using a semantic net data structure comprising nodes and relationships between the nodes, wherein the context representation is modeled to include an entity related to the at least one context entity, and the importance of the related entity is derived from the activation attribute of the at least one context entity referring to the related entity, and the indicated importance is determined in accordance with the sum of the products of the activation attribute values of the referring at least one context entity and a weighting factor assigned to the relation type linking the at least one context entity and the referred entity.

2. The computer system according to claim 1, wherein the activation attribute has a value.

3. The computer system according to claim 2, wherein the value of the activation attribute is numeric.

4. The computer system according to claim 2, wherein the value of the activation attribute of the at least one context entity varies in a time dependent manner.

5. The computer system according to claim 4, wherein the value of the activation attribute decreases over time according to a predetermined fade curve.

6. The computer system according to claim 5, wherein the predetermined fade curve is arranged to vary depending on at least one of the highest activation attribute value of the at least one context entity reached and the frequency of usages of the at least one context entity.

7. The computer system according to claim 2, wherein the value of the activation attribute increases if the at least one context entity is used in connection with a user interaction.

8. The computer system according to claim 1, wherein the processor further executes an instruction to add an entity related to at least one context entity to the context representation if the indicated importance exceeds a predetermined threshold.

9. The computer system according to claim 1, wherein the processor further executes an instruction to remove the at least one context entity from the context representation if its importance falls below a predetermined threshold.

10. The computer system according to claim 1, further comprising an attribute calculator for calculating a value of the activation attribute.

11. The computer system according to claim 10, wherein the calculator calculates the attribute in a cyclic manner.

12. The computer system according to claim 11, wherein the calculator is arranged, in a first cycle, to assign a preset activation value to the at least one context entity and, in a second and any subsequent cycle, to recalculate the activation attribute value by taking into account the sum of the activation attribute values of an entity related to the at least one context entity.

13. The computer system according to claim 12, wherein the calculator is arranged to take into account a weighting factor characteristic of the kind of relation between the at least one context entity and the related entity.

14. The computer system according to claim 12, wherein the calculator is arranged to apply a scaling factor to the activation attribute values so that the sum of the activation values of the context entities is substantially a constant.

15. The computer system according to claim 10, wherein the calculator is arranged to calculate the activation attribute value of the at least one context entity on the basis of the number of entities related to the at least one context entity.

16. The computer system according to claim 10, wherein the calculator is arranged to calculate the activation attribute value of the at least one context entity on the basis of the kind of relationship between entities related to the at least one context entity.

17. A computer-implemented method for modeling a context representation in a business application, comprising the steps performed by a computer of:

storing at least one collection of references to a plurality of entities in a database;

determining, by a processor, a subset of the plurality of entities that are relevant to a current context, the current context comprising a combination of at least a user context and a session context, the user context comprising at least one of a role, project, or personal preference, and the session context comprising at least one of a last action or a manipulated business entity;

assigning an activation attribute to at least one context entity included in the determined subset, the at least one context entity having a temporal validity, and the activation attribute indicating an importance level of the at least one context entity in the current context; and modeling the context representation using the activation attribute assigned to the at least one context entity, wherein the modeling comprises using a semantic net data structure comprising nodes and relationships between the nodes, wherein modeling the context representation includes considering for the context representation an entity related to the at least one context entity, and wherein the importance of the related entity is derived from the activation attribute of the at least one context entity referring to the related entity, and wherein the derived importance is determined in accordance with the sum of the products of the activation attribute values of the referring at least one context entity and a weighting factor assigned to the relation type linking the at least one context entity and the referred entity.

18. The computer-implemented method according to claim 17, further comprising:

assigning a value to the activation attribute.

19. The computer-implemented method according to claim 18, further comprising:

assigning a numeric value to the activation attribute.

20. The computer-implemented method according to claim 18, wherein modeling the context representation includes varying in a time dependent manner the value of the activation attribute of the at least one context entity.

21. The computer-implemented method according to claim 20, wherein varying in a time dependent manner the value of the activation attribute includes decreasing over time the value of the activation attribute according to a predetermined fade curve.

22. The computer-implemented method according to claim 21, wherein decreasing over time the value of the activation attribute includes determining the predetermined fade curve depending on at least one of the highest activation attribute value of the at least one context entity reached and the frequency of usages of the at least one context entity.

23. The computer-implemented method according to claim 17, wherein modeling the context representation includes adding an entity related to at least one context entity to the context representation if the indicated importance exceeds a predetermined threshold.

24. The computer-implemented method according to claim 17, wherein modeling the context representation includes removing the at least one context entity from the context representation if its importance falls below a predetermined threshold.

25. The computer-implemented method according to claim 17, further comprising:
increasing the value of the activation attribute if the at least one context entity is used in connection with a user interaction.

26. The computer-implemented method according to claim 17, wherein modeling includes calculating a value of the activation attribute.

27. The computer-implemented method according to claim 26, wherein the activation attribute is calculated in a cyclic manner.

28. The computer-implemented method according to claim 27, wherein calculating the activation attribute includes, in a first cycle, assigning a preset activation attribute value to the at least one context entity and, in a second and any subsequent cycle, recalculating the activation attribute value by taking into account the sum of the activation attribute values of an entity related to the at least one context entity.

29. The computer-implemented method according to claim 28, wherein calculating the activation attribute includes taking into account a weighting factor characteristic of the kind of relation between the at least one context entity and the related entity.

30. The computer-implemented method according to claim 28, wherein calculating the activation attribute includes applying a scaling factor to the activation attribute values so that the sum of the activation values of the context entities is substantially a constant.

31. The computer-implemented method according to claim 26, wherein calculating the activation attribute occurs on the basis of the number of entities related to the at least one context entity.

32. The computer-implemented method according to claim 26, wherein calculating the activation attribute occurs on the basis of the kind of relationship between entities related to the at least one context entity.

33. A computer program product comprising a computer-readable storage device, the computer-readable storage device embodying a program comprising instructions executable by a processor to perform a method for modeling a context representation in a business application, the method comprising:

storing at least one collection of references to a plurality of entities in a database;

determining a subset of the plurality of entities that are relevant to a current context, the current context comprising a combination of at least a user context and a session context, the user context comprising at least one of a role, project, or personal preference, and the session context comprising at least one of a last action or a manipulated business entity;

assigning an activation attribute to at least one context entity included in the determined subset, the at least one context entity having a temporal validity, and the activation attribute indicating an importance level of the at least one context entity in the current context; and modeling the context representation using the activation attribute assigned to the at least one context entity, wherein the modeling comprises using a semantic net data structure comprising nodes and relationships between the nodes, wherein modeling the context representation includes considering for the context representation an entity related to the at least one context entity, and wherein the importance of the related entity is derived from the activation attribute of the at least one context entity referring to the related entity, and wherein the derived importance is determined in accordance with the sum of the products of the activation attribute values of the referring at least one context entity and a weighting factor assigned to the relation type linking the at least one context entity and the referred entity.

\* \* \* \* \*